United States Patent [19]

Covington

[11] Patent Number: 5,690,816
[45] Date of Patent: Nov. 25, 1997

[54] ANTI-DRAIN BACK/PRESSURE RELIEVED FILTER CARTRIDGES

[75] Inventor: Edward A. Covington, Gastonia, N.C.

[73] Assignee: Dana Corporation, Toledo, Ohio

[21] Appl. No.: 556,595

[22] Filed: Nov. 13, 1995

[51] Int. Cl.$^6$ ............................................. B01D 35/147
[52] U.S. Cl. .................... 210/130; 210/136; 210/430; 210/440; 210/DIG. 17
[58] Field of Search .................... 210/130, 136, 210/440, 443, 444, DIG. 17, 429, 430

[56] References Cited

U.S. PATENT DOCUMENTS

| | | | |
|---|---|---|---|
| 2,092,162 | 9/1937 | Humbert, Jr. et al. | 210/438 |
| 2,183,616 | 12/1939 | Korte | 210/165 |
| 2,937,756 | 5/1960 | Humbert, Jr. | 210/444 |
| 3,132,097 | 5/1964 | Tietz | 210/130 |
| 3,231,089 | 1/1966 | Thornton | 210/130 |
| 3,235,085 | 2/1966 | Humbert, Jr. | 210/130 |
| 3,243,045 | 3/1966 | Tietz | 210/130 |
| 3,305,095 | 2/1967 | Hathaway | 210/130 |
| 3,332,554 | 7/1967 | Humbert, Jr. | 210/130 |
| 3,529,722 | 9/1970 | Humbert, Jr. | 210/130 |
| 3,557,957 | 1/1971 | Baldwin | 210/130 |
| 3,567,023 | 3/1971 | Buckman et al. | 210/130 |
| 3,785,491 | 1/1974 | Dudinec et al. | 210/130 |
| 4,144,168 | 3/1979 | Thornton | 210/130 |
| 4,732,678 | 3/1988 | Humbert, Jr. | 210/440 |
| 4,872,976 | 10/1989 | Cudaback | 210/130 |
| 5,284,579 | 2/1994 | Covington | 210/130 |
| 5,405,527 | 4/1995 | Covington | 210/130 |

FOREIGN PATENT DOCUMENTS

| | | | |
|---|---|---|---|
| 722021 | 11/1965 | Canada | 210/130 |
| 1525689 | 9/1978 | United Kingdom | 210/DIG. 17 |

*Primary Examiner*—Matthew O. Savage
*Attorney, Agent, or Firm*—Millen, White, Zelano & Branigan, P.C.

[57] ABSTRACT

A filter cartridge has an annular filter dement retained within a housing by an end plate. The end plate has a central outlet and a plurality of inlet holes mounted or the end plate is an annular valve support which supports an annular valve member disposed between the valve support and the filter cartridge. A coil spring urges the annular filter member against the valve member which, in turn, engages the valve support and urges the valve support against the end plate. The valve support has an inner sleeve portion which seats against the end plate and an outer sleeve portion with holes therethrough. The valve member has an expandable collar portion which normally seals the bypass holes and a skirt portion which normally seals the inlet holes. When the filter is filtering lubricating oil for an internal combustion engine, the skirt is deflected by pressurized lubricating oil and flows around and through the filter element before passing out of the central outlet in the end plate. When the engine is not running, oil in the filter cartridge is blocked from flowing back out of the inlet holes in the mounting plate. If the media of the filter element becomes clogged, then pressure is exerted through the bypass holes in the valve support and applied to the expandable collar of the valve member. The pressure causes the expandable collar of the valve member to expand to uncover the bypass holes. The lubricating oil then flows through the bypass holes and out of the central outlet opening without having to pass through the filter. Preferably, the valve member is unitary and is made of a resilient resinous material while the valve support is made of steel.

20 Claims, 4 Drawing Sheets

ANTI-DRAIN BACK/PRESSURE RELIEVED FILTER CARTRIDGES

FIELD OF THE INVENTION

The present invention relates to improvements in anti-drain back/pressure relieved filter cartridges. More particularly, the present invention relates to improvements in valve configurations for such filter cartridges and in improvements in configurations for retaining annular filter elements and valve components within filter cartridges.

BACKGROUND OF THE INVENTION

Annular filter elements are mounted in filter housings to form replaceable filter cartridges which are threadably mounted on internal combustion engines. These cartridges are known as "spin-on filters" because they are threadably mounted and removable. If a customer follows the recommended procedures for changing the filter cartridge when lubricating oil is changed, then it is unusual for the filter to clog; however, if the customer fails to change the filter cartridge, or if the lubricating oil becomes contaminated for some other reason, the filter can become clogged or either blocked or minimize flow of lubricating oil to the engine. If this happens, an engine can be destroyed or seriously damaged.

In order to avoid or at least minimize damage, filter cartridges have been configured to allow oil to bypass filter elements in the cartridges when the filter elements become clogged. The engine is thereafter supplied with at least unfiltered lubricant rather than no lubricant at all, or insufficient lubricant. It is also desirable to keep oil within the filter cartridge when the engine is not running so that when the engine is started, there is no substantial gap in the flow of lubricating oil caused by a slight delay as the filter cartridge refills with oil. This is accomplished by providing an anti-drain back valve which closes when not subjected to pressure from the engine's oil pump so as to prevent draining of oil from the filter back toward the engine.

Millions of filter cartridges are manufactured every year and millions are disposed of. Since these filter cartridges are disposable, reduction in their cost is highly desirable. One cost reduction approach is to reduce the number of parts and to simplify assembly. Heretofore this has been difficult to accomplish without compromising the effectiveness of the filter cartridges.

SUMMARY OF THE INVENTION

It is a feature of the present invention to provide a new and improved configuration for anti-drain back/pressure relieved filter cartridges.

In the present invention, a lubricating oil filter cartridge includes a housing with an annular filter element therein and an end plate, the end plate having inlet openings therethrough for allowing unfiltered lubricating oil to enter the housing and a central outlet for allowing filtered oil to pass out of the filter housing. In accordance with the present invention, the improvement comprises an annular valve support disposed between the end plate and the filter element, the annular valve element having an inner sleeve bearing against the end plate proximate the outlet and an outer sleeve with a plurality of holes therethrough for allowing lubricating oil to bypass the filter element when the holes are uncovered by an annular valve member. In order to support the annular filter element, the annular valve support further has a radially extending flange which underlies the annular filter element. The annular valve member has a flexible shirt which functions as an anti-drain back valve and an expandable collar fitting around the outer sleeve of the annular valve support to function as a bypass valve. In order to function as a bypass valve, the expandable collar normally covers the holes but and spreads to uncover the holes when the filter element becomes clogged. Consequently, unfiltered lubricating oil normally passes through the annular filter element, but when the filter element becomes clogged, bypasses the annular filter element and flows through the holes in the annular filter support.

In a further aspect of the invention, the annular valve member is disposed between the annular filter element and the outer sleeve of the annular valve support with the radially extending flap disposed between the radially extending flange of the annular valve support and the filter element.

In still a further aspect of the invention, the annular valve support is made of metal which may, for example, be steel.

DETAILED DESCRIPTION

Figure 1:
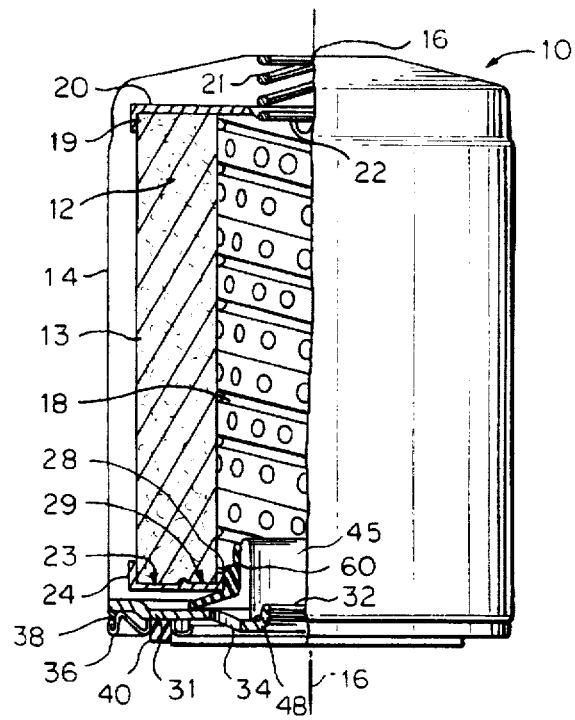
FIG. 1 is a side view, partially in section, of an anti-drain back/pressure relievable filter cartridge configured in accordance with the principles of the present invention, showing the filter cartridge in an anti-drain back mode when the filter is connected to an engine which is not running.

Referring now to FIG. 1, there is shown a lubricating oil filter cartridge 10 configured in accordance with the present invention, wherein the cartridge comprises an annular filter element 12 configured of a conventional pleated paper filament media 13, or some other filter material, contained within a cylindrical housing 14. The annular filter element 12 is concentric with respect to an axis 16 of the cartridge 10 and has a hollow core 18.

Figure 2:
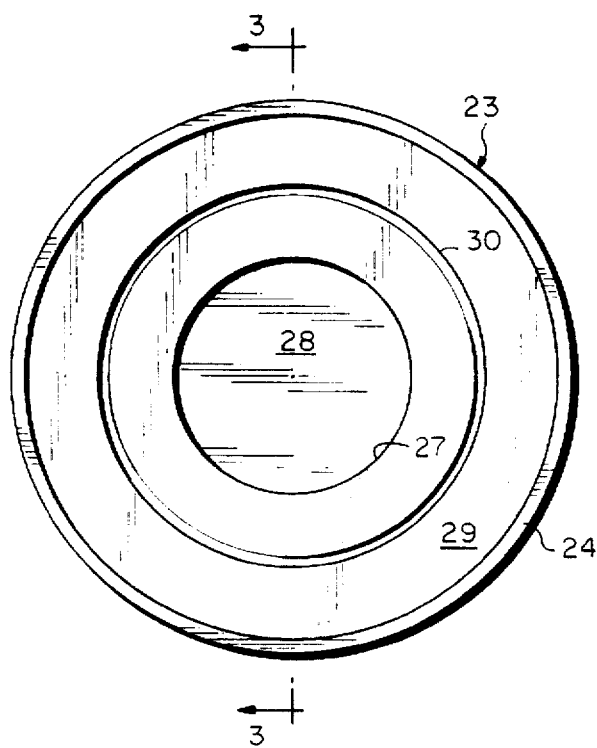
FIG. 2 is an end view of a bottom end cap used with a filter element supported in the filter cartridge of FIGS. 1—3.
Figure 3:
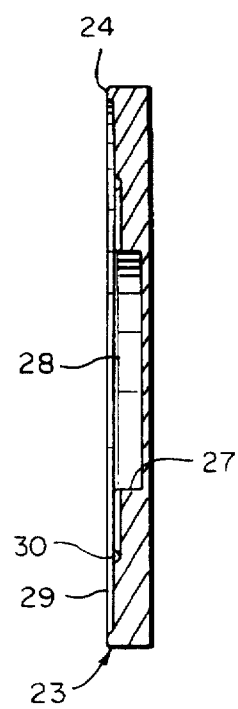
FIG. 3 is a side elevation of the end cap of FIG. 2 taken along lines 3—3 of FIG. 2.

The annular filter element 12 has a first end 19 configured as a closed, dished end cap 20 which is abutted by a spring 21 that is seated in a depression 22 within the closed, dished end cap (see FIGS. 2 and 3). At the second end of the annular filter element 12, there is an annular end cap 23 having an outer axial flange 24 and an inner axial flange 27 surrounding a central opening 28. The inner axial flange 27 is aligned with the hollow core 18 of the filter element. The inner and outer axial flanges are connected to one another via a radially extending plate 29 which has an annular stiffening offset 30 therein.

An end plate 31 encloses the filter element 12 in the housing 14. The end plate 30 includes a threaded outlet 32, coaxial with the axis 16 of the filter cartridge 10 and a plurality of inlet openings 34 (only one of which is shown) disposed in spaced relation with one another around the axis 16 of the cartridge 10. The end cap 30 is held proximate the end of the housing by a cover 36 which is crimped to the bottom end of the housing 14 by a peripheral crimp 38. An annular seal 40 seals the inlet openings 34 with respect to the environment surrounding the filter cartridge 10.

Figure 4:
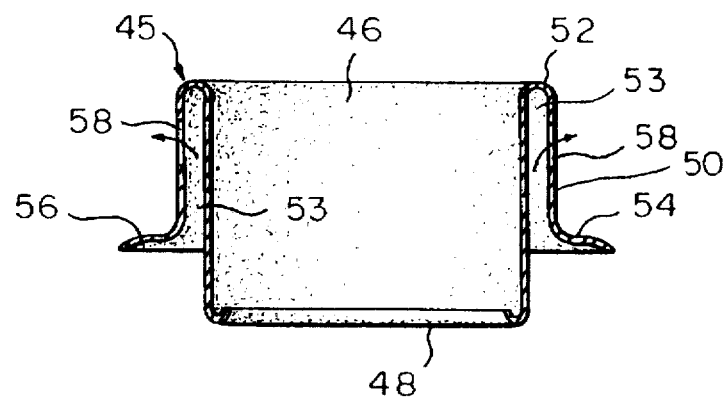
FIG. 4 is a side elevation of a combination valve member and filter element support.
Figure 5:
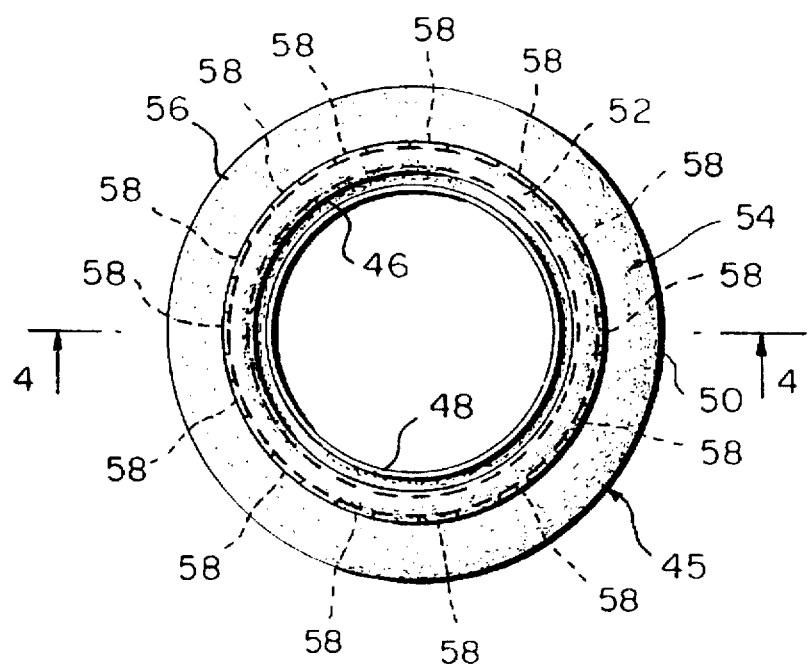
FIG. 5 is an end view of the support of FIG. 4.

Referring now mainly to FIGS. 4 and 5, there is shown a combination valve member and filter element support 45 preferably made of metal but can also be made of plastic. The support 45 has an inner sleeve 46 with an annular rolled stiffener 48 and an outer sleeve 50 which is connected to the inner sleeve by an annular, arcuate bight 52. The outer sleeve 50 has a radial flange 54 extending outwardly therefrom, the radial flange terminating in an upper convex surface 56.

Referring now to FIG. 1 in combination with FIGS. 4 and 5, it is seen that the filter and valve member support 45 is seated against the end plate 30 coaxially with the internally threaded outlet 32. The rolled end stiffener 48 forms an annular foot surrounding the outlet 32. As will be explained in more detail hereinafter, the inner and outer sleeves 46 and 50 of the support 45 are received within the central opening 28 of the end cap 23 shown in FIGS. 2 and 3. The end cap 23 also overlies the radial flange 54 of the combined valve member and filter element support 45.

Figure 6:
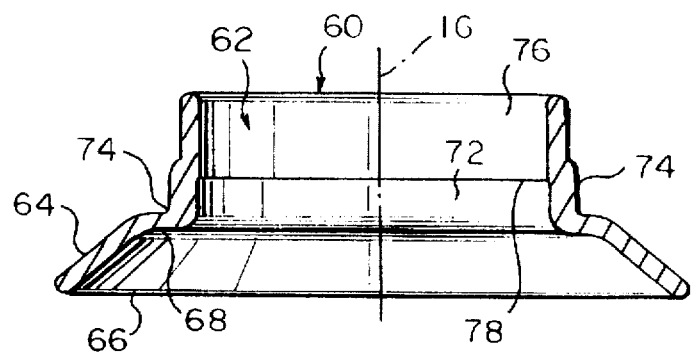
FIG. 6 is a side elevation of an annular valve member which is supported by the annular filter element and valve member support of FIGS. 4 and 5.
Figure 7:
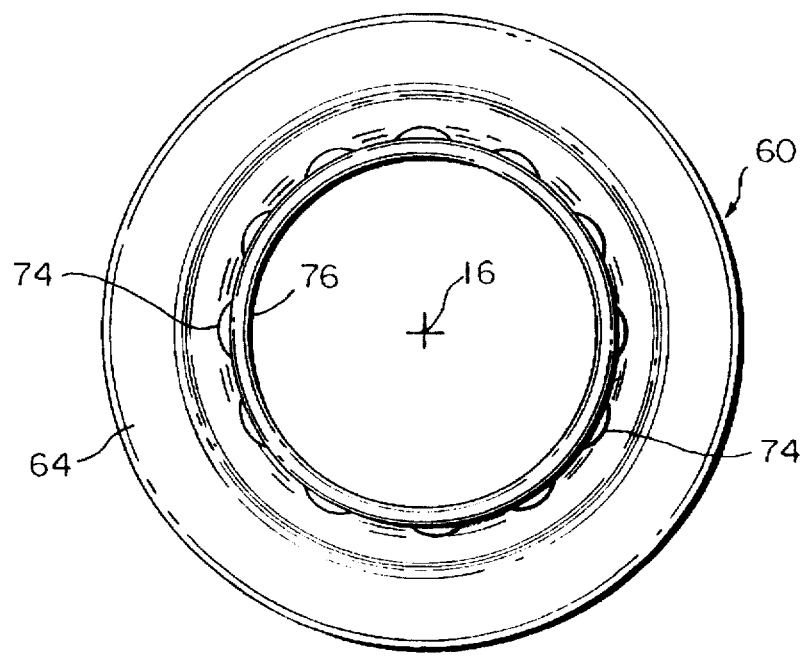
FIG. 7 is a top view of the valve member of FIG. 6.

Referring now to FIGS. 6 and 7, there is shown a valve member 60 which is comprised of an expandable collar portion 62 and a skirt portion 64. The collar 60 is preferably made of a material such as Goshen 2624 which is a rubber like low swell silicone material available from the Goshen Rubber Company. The skirt 64 has a frustoconical portion 66 which has a periphery 67 and a generally radial section 68 that joins the frustoconical section to the expandable collar portion 62. Disposed around the exterior of the radial collar portion 62 and a lower section 72 thereof are a plurality of fibs 74. The ribs 74 extend slightly past the lower portion 72 of the expandable collar to overlie part of an upper portion 76 and stiffen the portion of the collar portion on which they are located. The upper portion 76 is separated from the lower portion of the expandable collar 62 by a very narrow annular shoulder 78. The upper portion has an inner diameter of about 1/100ths of an inch less than the lower portion 72.

Figure 8:
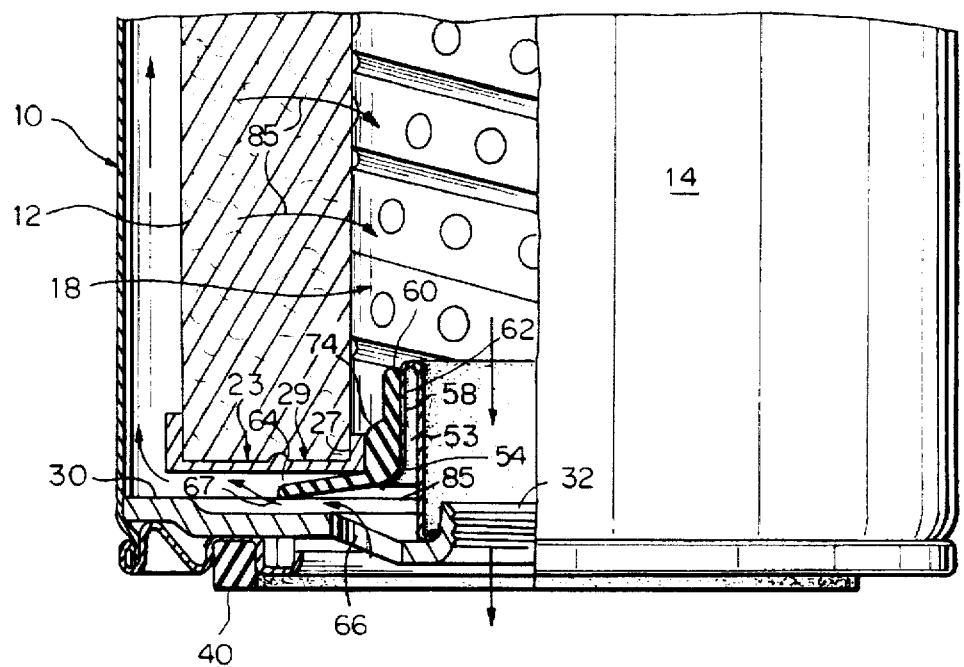
FIG. 8 is an enlarged view of a portion of the filter cartridge of FIG. 1, but showing the filter cartridge in an active mode filtering lubricating oil circulating in an operating engine.
Figure 9:
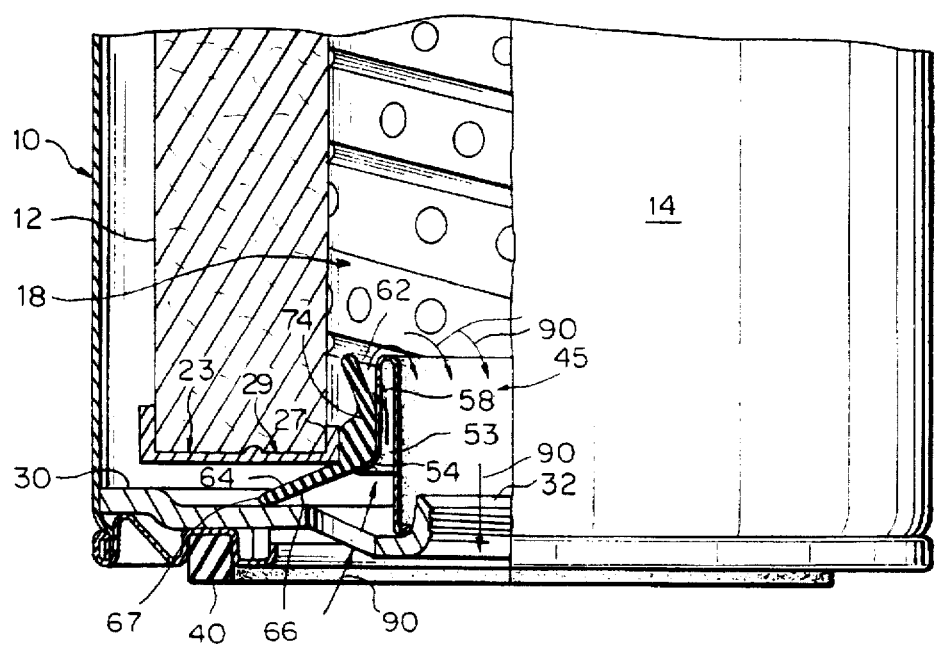
FIG. 9 is a view similar to FIG. 8, but showing the filter cartridge operating in a bypass mode when the filter element is clogged.

The valve member 60 of FIGS. 7 and 8 fits over the combined valve member and filter element support 45 of FIGS. 4 and 5 and, as is seen in FIGS. 1 has the annular end cap 23 of the filter element 12 urged thereagainst by the coil spring 21. As is best seen in FIGS. 8 and 9, the inner axial flange 27 of the end cap 23 is adjacent to and engages the ribs 74 on the expandable collar 62 and an inner peripheral portion of the plate 29 abuts the radially extending portion 68 of the skirt 64. The frustoconical portion 66 of the skirt 64 drapes over the upper convex surface 56 of the radial flange 54 with the peripheral end 67 of the skirt resting on the end plate 30.

Normally, when the engine (not shown) to which the canister 10 is connected is not operating (see FIG. 1), lubricating oil in the canister is retained in the canister by the skirt 64 because the frustoconical portion 66 of the skirt prevents lubricating oil from flowing out of the inlet holes 34. Accordingly, the skirt 64 functions as an anti-drain back valve.

As is seen in FIG. 8, when the engine is running, the frustoconical portion 66 of the skirt 64 deflects upwardly, allowing lubricating oil to flow in the direction of the arrows 85, wherein the lubricating oil flows around the outside of the filter element 12 and is forced radially therethrough into the hollow core 18 of the filter element, from which it then flows through the internally threaded out 32 and out of the filter cartridge 10.

When the filter element 12 becomes clogged, then the oil cannot follow the path of the arrows 85, because the oil cannot pass through the filter media 13 comprising the filter element 12. This forces the oil to apply pressure in the space 53 between the inner sleeve 46 and outer sleeve 50. Pressure in the space 53 is also applied through the series of holes 58 to the upper portion 76 of the expandable collar 62.

As is seen in FIG. 9, when the filter element 12 becomes clogged, the expandable collar 62 deflects radially outwardly and the oil follows the direction of the arrows 90, through the holes 58 and into the hollow core 18 of the filter element 12. From the hollow core of the filter element 12, the oil exits through central outer 32 and is pumped back to the engine without being filtered. While a lubricating oil following the direction of the arrows 90 is unfiltered, it still provides lubricant to the associated engine. This is of course preferable to the engine receiving no lubricant at all due to the filter element 12 being clogged. When the engine is stopped, the upper portion 76 of the expandable collar 62 retracts to its normal position of FIG. 1, sealing the holes 58 to prevent oil from draining from the filter cartridge 10.

With the aforedescribed arrangement, the unitary valve member 60 performs both the pressure relief and anti-drain back functions without the need for an additional spring. By making the valve member 60 of a material such as the preferred material, Goshen 2624, the bias necessary to close the valve member is unitary with its structure.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a lubricating oil filter cartridge, a housing with an annular filter element therein; the annular filter element having a hollow core and having an end cap with an inner axially extending flange, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve and including a plurality of holes therethrough, the outer sleeve having a radially extending flange extending outwardly therefrom for supporting the annular filter element; and an annular valve member disposed between the filter element and the outer sleeve of the valve support, the annular valve member having a radially extending skirt overlying the inlet openings in the end plate, the radially extending skirt functioning as an anti-drain back valve by preventing oil from flowing out of the filter through the inlet openings while allowing oil under pressure to deflect the flaps and to flow pass the annular valve member and through the annular filter element when the annular filter element is not clogged, the valve member further including an expandable collar fitting around the outer sleeve and covering the holes, the expandable collar spreading to uncover the holes when the filter element is clogged so that liquid can flow through the holes in the outer sleeve and through the central outlet to bypass the filter element when the filter element is clogged, the expandable collar having a plurality of ribs disposed in spaced relation therearound, the ribs engaging the inner axially extending flange of the annular end cap.

2. The improvement of claim 1, wherein the expandable collar is cylindrical and terminates outside of the outer sleeve of the annular valve support.

3. The improvement of claim 2, wherein the valve member is made of a resilient resinous material.

4. The improvement of claim 3, wherein the valve member is made of silicone.

5. The improvement of claim 4, wherein the annular valve support is made of steel or plastic.

6. In a lubricating oil filter cartridge, a housing with an annular filter element therein; the annular filter element having a hollow core and an end cap with an inner axially extending flange, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve and including a plurality of holes therethrough, the outer sleeve having a radially extending flange extending outwardly therefrom for supporting the annular filter element; and an annular valve member disposed between the filter element and the outer sleeve of the valve support, the annular valve member comprising an expandable collar fitting around the outer sleeve and covering the holes, the expandable collar spreading to uncover the holes when the filter element is clogged so that liquid can flow through the holes in the outer sleeve and through the central outlet to bypass the clogged filter, the expandable collar having a plurality of ribs disposed in spaced relation therearound, the ribs engaging the inner axially extending flange of the end cap.

7. The improvement of claim 6, wherein the expandable collar is cylindrical and terminates outside of the outer sleeve of the annular valve support.

8. The improvement of claim 7, wherein the valve member is made of a resilient resinous material.

9. The improvement of claim 8, wherein the valve member is made of silicone.

10. The improvement of claim 9, wherein the annular valve support is made of steel or plastic.

11. In a lubricating oil filter cartridge, a housing with an annular filter element therein; the annular filter element having a hollow core, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve and including a plurality of holes therethrough, the outer sleeve having a radially extending flange extending outwardly therefrom for supporting the annular filter element; and an annular valve member made of a resilient resinous material and having a radially extending skirt overlying the inlet openings in the end plate, the radially extending skirt functioning as an anti-drain back valve by preventing oil from flowing out of the filter through the inlet openings while allowing oil under pressure to deflect the flaps and to flow pass the annular valve member and through the annular filter element when the annular filter element is not clogged, the valve member further including an expandable collar fitting around the outer sleeve and coveting the holes, the expandable collar spreading to uncover the holes when the filter element is clogged so that liquid can flow through the holes in the outer sleeve and through the central outlet to bypass the filter element when the filter element is clogged and the annular collar including a plurality of ribs thereon, the ribs being disposed in a location between the skirt and expandable collar to stiffen the location.

12. The improvement of claim 11, wherein the annular valve member is disposed between the filter element and the outer sleeve of the valve support.

13. The improvement of claim 12, wherein the filter element has an end cap with an inner axially extending flange, the inner axially extending flange of the end cap engaging the expandable collar.

14. The improvement of claim 13, wherein the ribs engage the inner axially extending flange of the annular end cap.

15. The improvement of claim 11, wherein the expandable collar is cylindrical and terminates outside of the outer sleeve of the annular valve support.

16. The improvement of claim 15, wherein the valve member is made of silicone.

17. The improvement of claim 16, wherein the annular valve support is made of steel or plastics.

18. In a lubricating oil filter cartridge, a housing with an annular filter element therein; the annular filter element having a hollow core, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve with one end bearing against the end plate proximate the outlet, and an outer sleeve spaced from the inner sleeve extending substantially parallel thereto and including a plurality of holes therethrough, the outer sleeve having a radially extending flange extending outwardly therefrom for supporting the annular filter element and having an outer surface facing away from the inner sleeve; and an annular valve member made of a resilient resinous material and having a radially extending skirt overlying the inlet openings in the end plate, the radially extending skirt functioning as an anti-drain back valve by preventing oil from flowing out of the filter through the inlet openings while allowing oil under pressure to deflect the flaps and to flow pass the annular valve member and through the annular filter element when the annular filter element is not clogged, the valve member further including an expandable collar fitting around the outer surface of the outer sleeve and covering the holes, the expandable collar spreading to uncover the holes when the filter element is clogged so that liquid can flow through the holes in the outer sleeve and through the central outlet to bypass the clogged filter.

19. The improvement of claim 18, wherein the annular valve member is disposed between the filter element and the outer sleeve of the valve support.

20. The improvement of claim 19, wherein the filter element has an end cap with an inner axially extending flange, the inner axially extending flange of the end cap engaging the expandable collar.

* * * * *